United States Patent [19]

Lewis et al.

[11] Patent Number: 5,520,415
[45] Date of Patent: May 28, 1996

[54] HOODED HEAT SHIELD FOR AN AUTOMOTIVE AIR BAG CUSHION

[75] Inventors: Trudy C. Lewis, Roy; Lisa M. Frary, South Weber, both of Utah

[73] Assignee: Morton International, Inc., Chicago, Ill.

[21] Appl. No.: 510,250

[22] Filed: Aug. 2, 1995

Related U.S. Application Data

[63] Continuation of Ser. No. 249,565, May 26, 1994, abandoned.

[51] Int. Cl.⁶ ............................................. B60R 21/16
[52] U.S. Cl. ................................. 280/743.1; 280/732
[58] Field of Search ....................... 280/743.1, 728.1, 280/732, 742

[56] References Cited

U.S. PATENT DOCUMENTS

| | | | |
|---|---|---|---|
| 4,178,017 | 12/1979 | Ishi et al. | 280/740 |
| 4,830,401 | 5/1989 | Honda | 280/736 |
| 4,944,527 | 7/1990 | Bishop et al. | 280/741 |
| 5,100,168 | 3/1992 | Horiuchi et al. | 280/728.1 |
| 5,149,130 | 9/1992 | Wooley et al. | 280/743.1 |
| 5,160,164 | 11/1992 | Fischer et al. | 280/732 |
| 5,172,933 | 12/1992 | Strasser | 280/743.1 |
| 5,195,775 | 3/1993 | Komerska et al. | 280/732 |
| 5,226,671 | 4/1993 | Hill | 280/743 |
| 5,286,054 | 2/1994 | Cuevas | 280/738 |

FOREIGN PATENT DOCUMENTS 4234988  4/1993  Germany ................. B50R 21/16

*Primary Examiner*—Eric D. Culbreth
*Attorney, Agent, or Firm*—Mark F. LaMarre; Robert M. Didrick; Gerald K. White

[57] ABSTRACT

A heat resistant fabric shield that protects the inside surfaces of the top and side sections of an air bag cushion is disclosed. The fabric shield is attached to the air bag cushion adjacent to the gas inlet opening. Upon deployment of the cushion the fabric shield is moved into position by the flow of hot gases from the inflator to protect the inside surfaces of the cushion from the hot gases. After deployment the fabric shield falls into position on top of the inflator thus protecting and insulating the cushion from the hot inflator.

1 Claim, 6 Drawing Sheets

HOODED HEAT SHIELD FOR AN AUTOMOTIVE AIR BAG CUSHION

This is a continuation of application Ser. No. 08/249,565 filed on May 26, 1994, abondoned.

BACKGROUND OF THE INVENTION

1. Field of the Invention

The present invention relates to an automotive safety device which, upon the onset of a collision, deploys an inflatable restraint cushion, commonly known as an air bag cushion, so as to provide impact protection to occupants of the passenger vehicles. More particularly, this invention relates to a device for protecting the upper portion of the air bag cushion from hot gases generated during the deployment of the air bag cushion.

2. Description of Related Art

An air bag restraint system, referred to as a module, typically includes a canister which encloses a gas generator or, as it is commonly known, an inflator, and at least part of an air bag cushion, and a cover which conceals the module from view. When the vehicle is involved in a collision, a crash signal initiates operation of the inflator to cause the air bag cushion to deploy. The inflator produces an inert gas (e.g., nitrogen) which is directed under pressure into the air bag cushion to force it out of the canister incorporated into the module and into the passenger compartment of the vehicle. In a pyrotechnic-type inflator, gas is produced by the burning of a gas generating material. As the air bag cushion is forced out of the container, pressure exerted on the cover causes selected portions of the cover to separate in a predetermined manner along tear seams to enable the air bag cushion to be directed into the passenger compartment. As the air bag cushion is directed into the passenger compartment, it is inflated by the continued flow of gas produced by the inflator. One possible location for an air bag assembly is in the instrument panel or dashboard on the passenger side of the vehicle.

An air bag cushion is normally made from a synthetic material that is substantially impermeable to the flow of gas. During the early stages of the air bag cushion deployment, prior to the air bag cushion rupturing the tear seams of the cover, the inflator generates a large volume of hot gases under high pressure. The hot gases exiting from the inflator impinge on the top section and the side sections adjacent to the gas inlet opening of the air bag cushion. Normally, the air bag cushion is spaced a sufficient distance from the inflator that the hot gases do not affect the strength of the air bag cushion. However, when a more energetic deployment takes place the hot gases generated by the inflator may structurally affect the air bag cushion. Further, upon completion of the air bag cushion deployment, the air bag cushion collapses and falls onto or into the canister such that the fabric from which the cushion is made may come within close proximity to the hot inflator. It would be preferable to have a device that protects the air bag cushion from the hot deployment gases, while not inhibiting the operation of the inflator or air bag cushion during the deployment process. Further, it would be desirable to protect the air bag cushion from the heat emanating from the hot inflator after the deployment process has been completed.

Solutions to these problems have been accomplished by linings in the air bag cushion or diverters which redirect the flow of gas from the inflator. Such prior art solutions are disclosed in Acs, U.S. Pat. No. 3,214,458; Bishop el al., U.S. Pat. No. 4,944,527; Wooley et al., U.S. Pat. No. 5,149,130; and Fischer et al., U.S. Pat. No. 5,160,164.

Acs recites a combined heat and energy absorbing bag within the air bag cushion. The inner bag is in the form of a fiberglass bag that is expandable, but not stretchable, low porosity bag. The inner bag provides limitations to the overall air bag cushions. These limitations may not be acceptable in all air bag cushion designs.

Bishop recites a retainer in the form of a metal sheet having a set of U-shaped slots formed therein. When the metal sheet is formed into an open-ended cylinder the metal within the slots extends from the cylinder to form a heat shield. The inflator is inserted into the open-ended cylinder and the assembly is installed into the canister. This shield provides protection to the air bag cushion immediately adjacent to the inflator, however, that part of the air bag cushion extending beyond the canister may not protected from hot gases produced by an energetic inflator.

Wooley recites a heat resistive fabric liner interposed between a heat shield chamber containing a pyrotechnic inflator and the base of the air bag cushion. Alternatively, the base of the air bag cushion may be formed from a heat resistive fabric. The heat resistive liner or bag section protects the base of the air bag cushion from heat conducted from the inflator after the cushion has been deployed, however, the liner does not protect that portion of the cushion covering the air bag canister from hot gases generated during deployment.

Fischer recites a deflector, which is made from the same material as the air bag cushion, that redirects the flow of gas from the inflator so that the initial contact between the air bag cushion and a vehicle occupant is at the occupant's torso. Such modification of the deployment may not always be beneficial. Further, the deflector may not reposition itself after deployment is complete to cover the inflator and protect the air bag cushion from post deployment burn through.

SUMMARY OF THE INVENTION

An object of this invention is to protect the top inside surface adjacent to the gas inlet opening of an air bag cushion from the hot gases produced during the initial phase of the inflation of the cushion without modifying the deployment of the cushion.

An object of this invention is to protect the inside surfaces of the air bag cushion side panels adjacent to the gas inlet opening of an air bag cushion from the hot gases produced during the initial phase of the inflation of the cushion without modifying the deployment of the cushion.

A related object of this invention is to protect the inside surfaces of the top section and side panels of an air bag cushion adjacent to the gas inlet opening from hot gases, contact with the hot inflator surface, and radiant heating produced by the inflator after the air bag cushion has deployed and has been collapsed on top of the instrument panel due to depressurization of the cushion.

These and other objectives of the invention, which will become apparent from the following description, have been achieved by a novel fabric shield disposed inside the air bag cushion and attached adjacent to the gas inlet opening of the air bag cushion. The fabric shield can be attached along the top edge of the canister adjacent to the air bag cushion gas inlet opening or along the top and side edges of the air bag cushion. The edge of the fabric shield opposite to the attached edge is left unattached and is designed to be free to move with the flow of gas from the inflator. The fabric shield is preferably made from non-flammable material such as silicon coated fiberglass.

During the initial stage of deployment the fabric shield protects the inside top surface of the air bag cushion by covering the surface. The fabric shield moves with the air bag cushion during deployment due to the flow of gas from the inflator without modifying the deployment of the air bag cushion. After the flow of gas from the inflator has stopped the fabric shield is no longer retained in position covering the inside surface of the cushion and falls over the canister opening thereby covering the inflator. This protects the air bag cushion from the hot gases and radiant heating from the inflator.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which.

DETAILED DESCRIPTION OF THE INVENTION

Description of the Preferred Embodiment(s)

Figure 1:
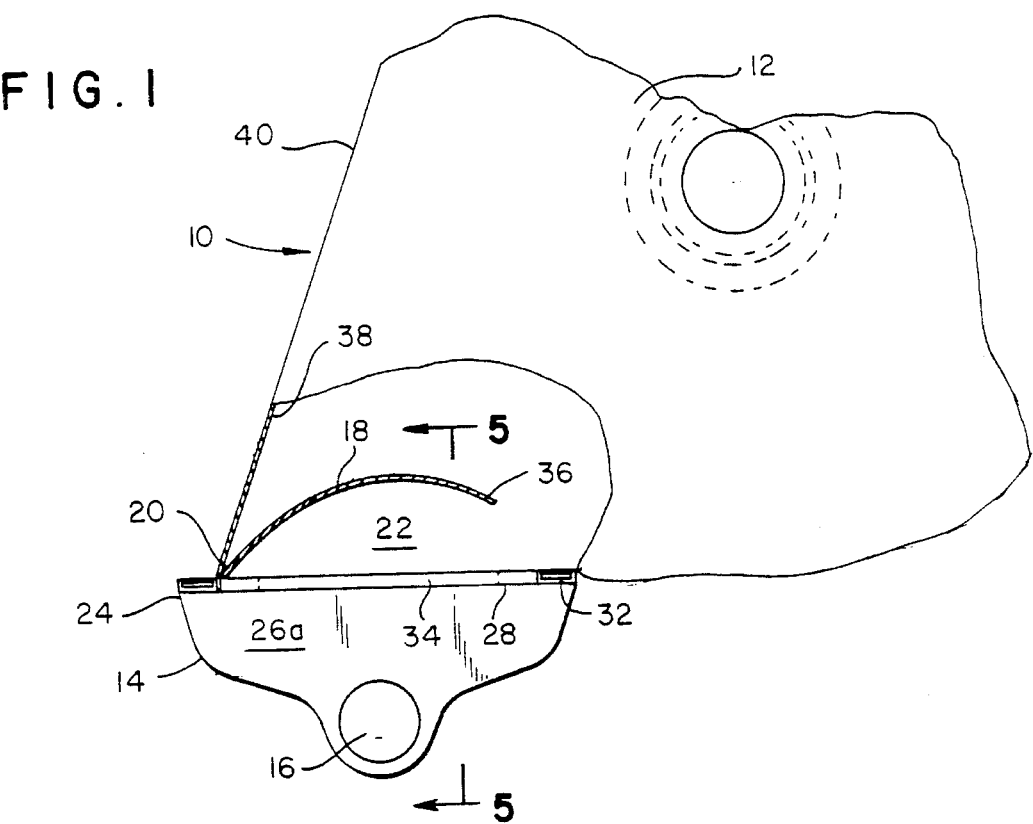
FIG. 1 is a partial cross-sectional view illustrating the heat shield of the invention moving into position due to the flow of hot gases from the inflator.
Figure 2:
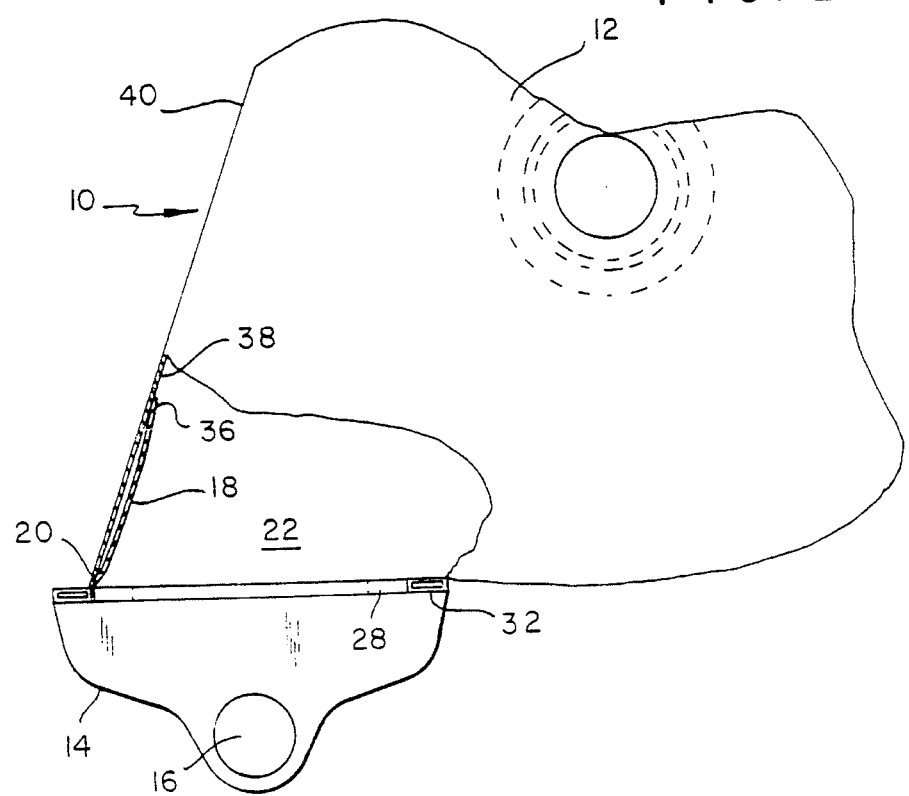
FIG. 2 is a partial cross-sectional view illustrating the heat shield covering top inside portion of the air bag cushion adjacent to the gas inlet opening.
Figure 3:
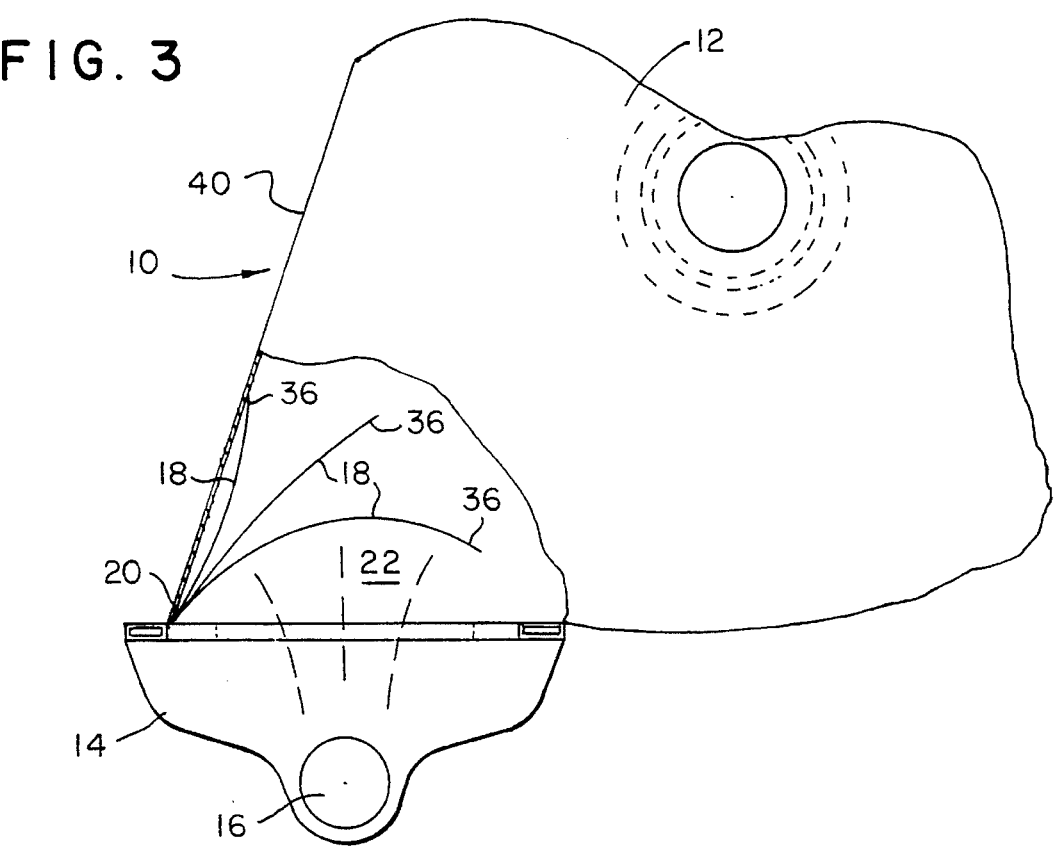
FIG. 3 is a partial cross-sectional view illustrating the movement of the heat shield during the initial stages of the deployment of the air bag cushion.
Figure 4:
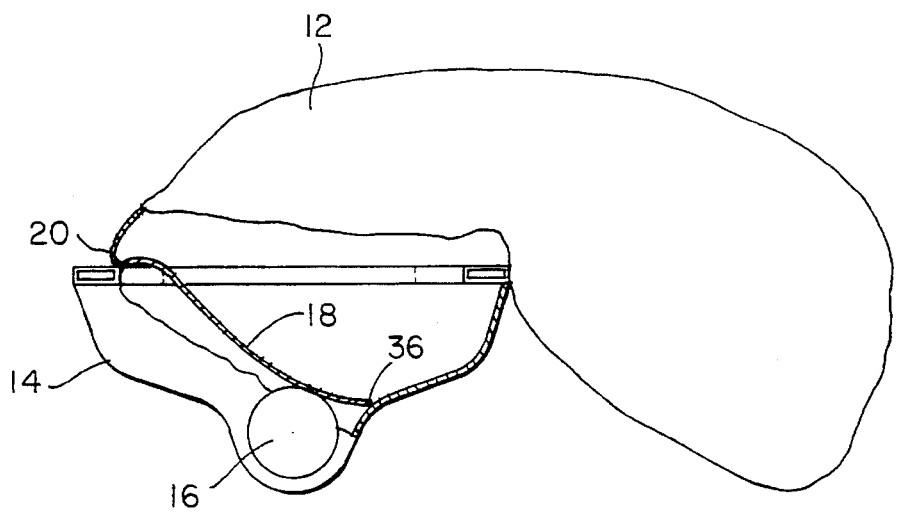
FIG. 4 is a partial cross-sectional view illustrating the fabric heat covering the inflator after the inflator has stopped providing a constant flow of gas to inflate the air bag cushion.
Figure 5:
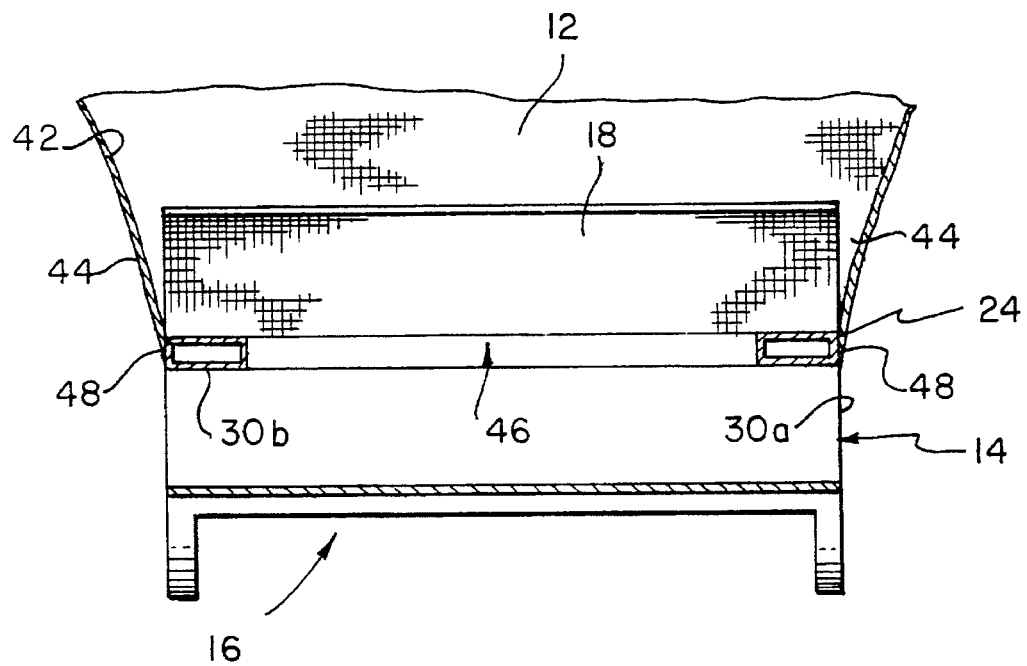
FIG. 5 is a cross-sectional view taken along line 5—5 of FIG. 1 illustrating the fabric shield in a partially deployed condition.

Referring to FIGS. 1 to 5, an air bag assembly with the heat shield of this invention is shown generally at 10. An air bag cushion 12 is shown in a partially deployed condition attached to a canister 14 containing an inflator 16. The fabric heat shield 18 of this invention is shown in an intermediate position in FIG. 1 and in a fully deployed condition in FIG. 2. The first edge 20 of the fabric heat shield 18 can be attached to the air bag cushion 12 adjacent to the gas inlet opening 22 thereof along the top section 24 and the side sections 26a and 26b of the canister 14. The first edge 20 can also be attached to the top section 28 and the side sections 30a and 30b of a cushion retainer 32 that is in turn attached to the top opening 34 of the canister 14. The second edges 36 of the fabric heat shield 18 are left unattached so that it is free to move with the flow of hot gases produced by the inflator 16, as shown in FIG. 3. When the fabric heat shield 18 is fully deployed, as shown in FIG. 2, it covers the inside surface 38 of the air bag cushion top section 40 and the inside surface 42 of the side panels 44. When the flow of hot gases from the inflator 16 has ceased, and the air bag cushion 12 has depressurized, the fabric heat shield 18 falls into position over the inflator 16 in canister 14, as shown in FIG. 4.

Figure 7:
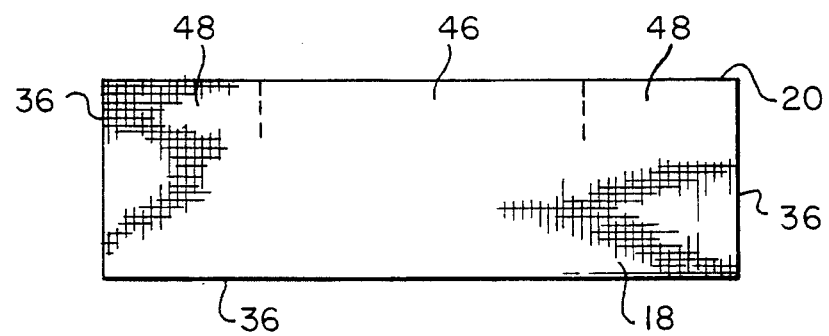
FIG. 7 is a top plan view of the fabric shield prior to installation in an air bag module.
Figure 8:
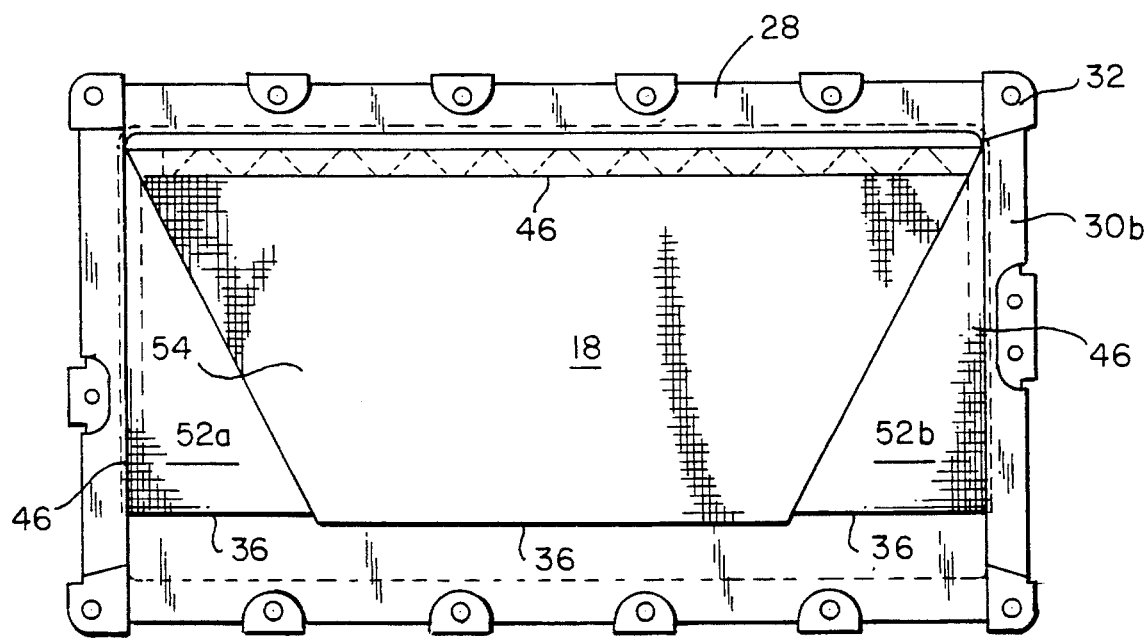
FIG. 8 is a bottom plan view, as seen from the canister side, illustrating the fabric shield in a stored condition.

The fabric heat shield 18 of this invention, as shown in FIG. 7, is a sheet of heat-resistant fabric that is attached to the air bag cushion 12 adjacent the gas inlet opening 22. The fabric heat shield 18 can be made from any heat-resistant fabric such as aromatic polyamide fiber, such as Kevlar® chemically treated or coated nylon, polyester, and fiberglass, with silicone coated fiberglass being preferred. The chemical coating or treatment can be neoprene or silicone. The fabric heat shield 18 is normally attached to the air bag cushion 12 adjacent to the gas inlet opening 22, as is shown in FIG. 8. The center section 46 of the first edge 20 is attached adjacent to the top section 40 of the air bag cushion 12 with a zig-zag stitch and the edge sections 48 of the first edge 20 of the fabric heat shield 18 are attached to the side panel 44 of the air bag cushion 12 by a straight stitch or a lock stitch. The fabric heat shield 18 is folded during storage in the air bag cushion 12 so that side panels 52a and 52b are formed. The middle section 54 is folded in order that the fabric heat shield 18 lays flat in order to reduce the total volume occupied by the air bag cushion 12 and to aid in assembly.

Figure 6:
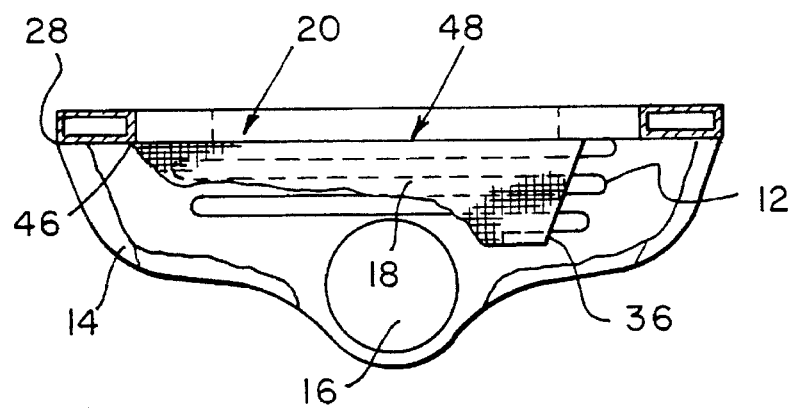
FIG. 6 is a fragmented side-plan view illustrating the fabric shield installed in an air bag module.

The fabric heat shield 18 of this invention can be used with any air bag cushion 12, inflator 16, and canister 14 known in the art. The air bag cushion 12 with the fabric heat shield 18 attached is secured to the canister opening 34 by cushion retainer 32 that is attached to the top opening 34 of the canister 14. The air bag cushion 12 is then folded and installed into the canister 14, as shown in FIG. 6. The assembly is then oriented and installed in a vehicle using techniques known in the art.

Figure 9A:
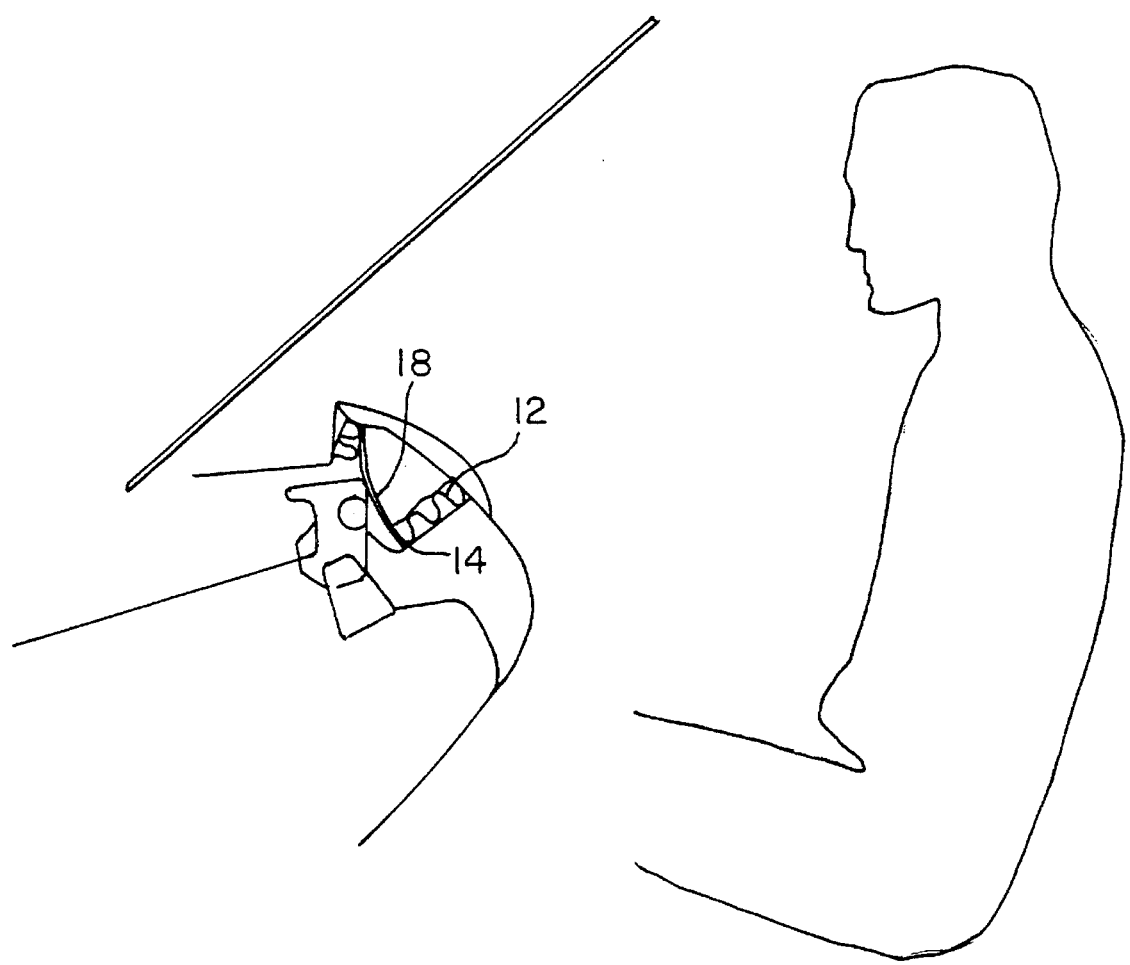
FIGS. 9a to 9c are cross-sectional schematic views illustrating the movement of the heat shield and air bag cushion during deployment.
Figure 9B:
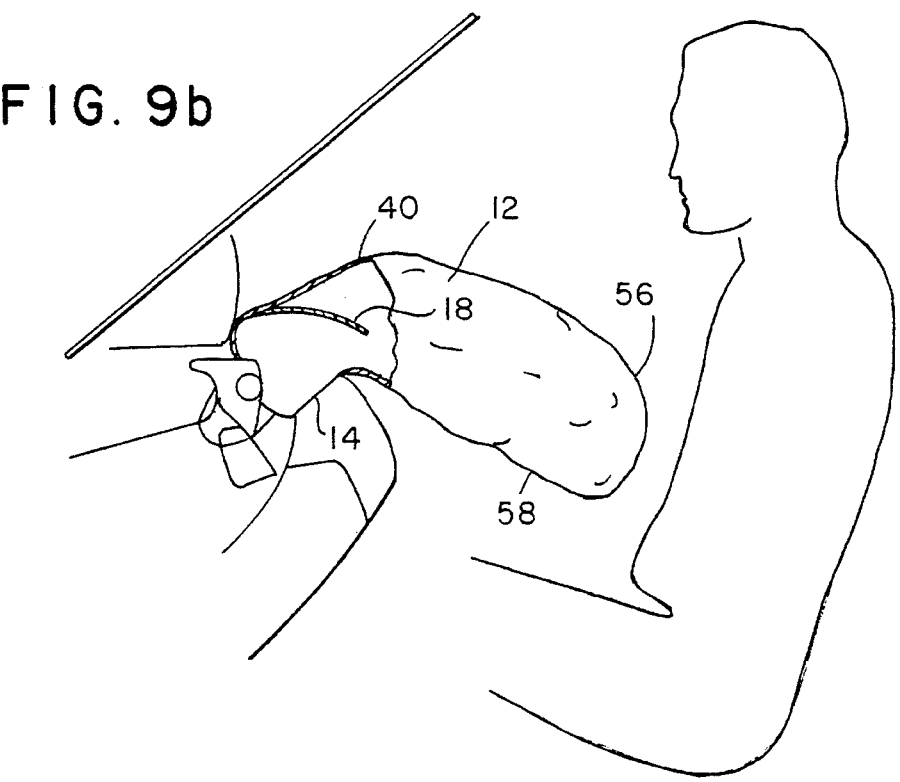
Figure 9C:
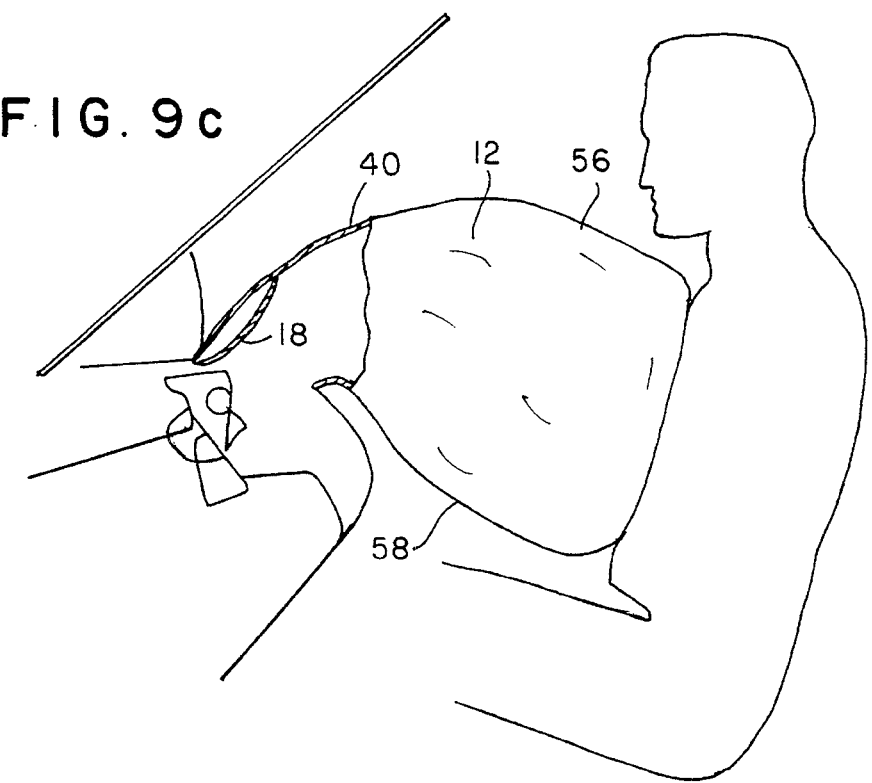

The assembly containing the fabric heat shield 18 as it would normally be positioned in a motor vehicle is shown in FIG. 9a. The deployment of the air bag cushion 12 is initiated when the inflator 16 receives an electrical signal from a crash sensor (not shown), as is shown in FIGS. 9b and 9c. The inflator 16 produces hot gases under pressure that are directed into the air bag cushion 12. As the air bag cushion 12 is deployed the top section 40 is disposed opposite the windshield, with a front section 56 disposed opposite the upper body of an occupant, and the bottom section 58 of the air bag cushion being disposed opposite the lower body of the occupant. As the gases impinge on the fabric heat shield 18, the fabric heat shield 18 moves with the air bag cushion 12, as shown in FIGS. 9b and 9c, protecting the top and side inside surfaces of the air bag cushion 12 from the hot gases and any particles that may be released from the inflator 16. After the deployment of the air bag cushion 12 has been completed and the air bag cushion 12 has depressurized, the fabric heat shield 18 falls into position over the inflator 16, as is shown in FIG. 4, thereby insulating and shielding the air bag cushion 12 from the hot inflator be.

Thus, in accordance with the invention, there has been provided a device which protects the inside surface adjacent to the gas inlet opening of an air bag cushion from the hot gases produced during the initial phase of the inflation of the cushion without modifying the deployment of the cushion. There has also been provided a device which protects the inside surface of an air bag cushion adjacent to the gas inlet opening from hot gases and radiant heating produced by the inflator after the air bag cushion has deployed and has been collapsed on top of the instrument panel due to depressurization of the air bag cushion.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A device for protecting the interior surface of a vehicle air bag cushion from hot gases generated by a gas generator during the deployment of said air bag cushion, said air bag cushion having a top section, a bottom section and side sections, said top, bottom and side sections defining an interior volume, and having a gas inlet opening; said device comprising a hooded non-flammable fabric shield folded within said air bag cushion and having a first edge having a center section attached to said cushion adjacent to the gas inlet opening and edge sections attached to the side sections of the cushion, and a second, unattached edge opposite thereof; said shield having a middle section and side panels at opposite edges of said middle section and being adapted to being moved against the interior top surface of said air bag cushion adjacent said gas inlet by the hot gases and to falling over said gas generator to insulate the cushion from the inflator after said gas generator has stopped generating hot gases.

* * * * *